US009177361B2

(12) United States Patent
Marconi et al.

(10) Patent No.: US 9,177,361 B2
(45) Date of Patent: Nov. 3, 2015

(54) SYSTEMS, METHODS AND DEVICES FOR ROTATING IMAGE TILES USING LINE SEGMENT READ BUFFERS

(75) Inventors: Theresa Michelle Marconi, Penfield, NY (US); Xing Li, Webster, NY (US); William David Notovitz, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 1029 days.

(21) Appl. No.: 13/026,980

(22) Filed: Feb. 14, 2011

(65) Prior Publication Data

US 2012/0206770 A1    Aug. 16, 2012

(51) Int. Cl.
*G06T 3/60* (2006.01)

(52) U.S. Cl.
CPC ............... *G06T 3/602* (2013.01); *G06T 3/606* (2013.01); *G06T 2200/28* (2013.01)

(58) Field of Classification Search
CPC ...... G06T 2200/28; G06T 3/602; G06T 3/606

USPC .................................... 358/1.1, 1.16
See application file for complete search history.

(56) References Cited

U.S. PATENT DOCUMENTS 4,972,500 A * 11/1990 Ishii et al. ..................... 382/274
2001/0043758 A1 * 11/2001 Yamaguchi et al. .......... 382/297

* cited by examiner

*Primary Examiner* — King Poon
*Assistant Examiner* — Iriana Cruz
(74) *Attorney, Agent, or Firm* — MH2 Technology Law Group LLP (57) ABSTRACT

An embodiment generally relates to a device for rotating image tiles using line segment read buffers. The device comprises an image memory configured to store an image and a plurality of buffers, wherein the image comprises a plurality of tiles. The plurality of buffers comprises line segment read buffers configured to interface with the image memory to read line segments of the plurality of tiles from the image memory. A rotator logic module is configured to micro-rotate the line segments, aggregate the line segments as rotated tiles, and macro-rotate the rotated tiles to determine an address of the image memory at which to write the rotated tiles. Write buffers are configured to write the rotated tiles to the image memory at the determined address.

23 Claims, 4 Drawing Sheets

SYSTEMS, METHODS AND DEVICES FOR ROTATING IMAGE TILES USING LINE SEGMENT READ BUFFERS

FIELD OF THE INVENTION

This invention relates generally to images, more particularly, systems, methods and devices for efficiently rotating image tiles using line segment read buffers.

BACKGROUND OF THE INVENTION

Image processing systems typically include an input device such as a scanner and a computer system that is equipped with document applications for storing and editing scanned electronic documents and an output device such as a printing system for rendering documents. The computer system is operated by a user to edit or to view scanned "softcopy" digital images on a monitor of the computer system. The user can subsequently generate "hardcopy" reproductions of the softcopy images by instructing the computer system to provide the processed electronic image to a selected printing device. Advances in printing technology together with advances in computer system technology are helping image processing systems become more pervasive in desk-top publishing and business applications. Ink jet, thermal-transfer, and xerographic color are examples of printing technologies that are making moderate resolution affordable.

Electronic images or "softcopy" images processed by desk-top publishing applications consist of two dimensional arrays of picture elements (pixels) or image signals. Historically small computer memories require the use of intermediate disk buffers to rotate an electronic image of reasonable size. However, with the availability of larger computer memories, desk-top publishing applications can store entire electronic images in real memory. Even with large real memory allocations, there is not always sufficient memory to store both an original image and a rotated image. In some systems for example, available computer memory is large enough to contain one electronic image but not large enough to contain both an original image and a rotated image. In such instances rotating an electronic image in place, that is, within its own buffer and without the use of significant intermediate memory or auxiliary memory is desirable. To rotate an electronic image in place requires that sequences of replacement operations are performed to an electronic image that is stored in an image buffer. Each replacement operation of a sequence must be performed so that each replacement operation does not erase pixels in the image buffer not already transferred.

Digital copiers are another type of image processing devices that scan an image, store a digital representation of the image in memory, and print the digital representation of the image. In order to print the digitized images at a rate similar to rates produced by conventional analog copiers that never store a digital representation of the image but use optical components such as mirrors and lenses to generate an image on a photoconductive drum or belt, a very large amount of data must be moved at a high rate of speed. The requirement to quickly move such a large amount of data has pushed the capabilities of current data processing and storage devices to their limits.

The use of image tiles to rotate an image can reduce memory consumption. However, to scale up the performance of an image rotation by increasing the size of the tiles can adversely affect on-chip memory resources. Therefore, it may be desirable to have memory-efficient systems and methods of rotating image tiles. In particular, it may be desirable to have systems and methods of rotating line segments of image tiles at a high bandwidth without adversely affecting memory consumption.

SUMMARY

An embodiment generally relates to a device for rotating images. The device comprises an image memory configured to store an image and a line segment buffer, wherein the image comprises a plurality of tiles. The line segment buffer is configured to interface with the image memory to read lines of a tile from the image memory. The device also includes a processor configured to interface with the line segment buffer to read the lines from the line segment buffer, rotate the lines based on an orientation selection, transfer the rotated lines to a write buffer for aggregation as a rotated tile, and determine a new address in the image memory for the rotated tile. Further, the write buffer is configured to write the rotated tile to the image memory at the new address.

Another embodiment pertains generally to a method for operating a device. The method includes storing a digital image in an image memory, wherein the digital image comprises a plurality of tiles, and transferring lines of a tile to a line segment buffer. The method also includes rotating the lines according to one of a 90 degree rotation, a 180 degree rotation, and a 270 degree rotation. The method also includes transferring the rotated lines to a write buffer for aggregation as a rotated tile, determining a new address in the image memory for the rotated tile, and transferring the rotated tile to the image memory from the write buffer for storage at the new address.

Yet another embodiment relates generally to a system for rotating images. The system includes a processor coupled to memory. The processor is configured to implement an image memory configured to store an image comprising a plurality of tiles, and a line segment buffer configured to read lines of a tile from the image memory. Further, the processor is configured to read the lines from the line segment buffer and rotate the lines based on an orientation selection. Still further, the processor is configured to transfer the rotated lines to a write buffer for aggregation as a rotated tile, and determine a new address in the image memory for the rotated tile. Still further, the write buffer is configured to transfer the rotated tile to the image memory at the new address.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of image processing systems, and that any such variations do not depart from the true spirit and scope of the present invention. Moreover, in the following detailed description, references are made to the accompanying figures, which illustrate specific embodiments. Electrical, mechanical, logical and structural changes can be made to the embodiments without departing from the spirit and scope of the present invention. The following detailed description is, therefore, not to be taken in a limiting sense and the scope of the present invention is defined by the appended claims and their equivalents.

Embodiments generally relate to systems and methods for optimizing a configurable digital image rotator. More particularly, a configurable digital image rotator can comprise an image memory, a set of ping-pong buffers, and a rotator logic module. The image memory can be configured to store the digital representation of an image. The image memory can be implemented with a form of non-persistent memory such as dynamic random access memory (DRAM), static RAM, DDR-RAM, or other similar types of memory. In embodiments, the image memory can also be configured to interface with the set of ping-pong buffers. In aspects, systems, methods, and devices of the types described in U.S. Pat. No. 7,768,678 entitled "SYSTEMS, METHODS AND DEVICES FOR ROTATING IMAGES" issued Aug. 3, 2010, by inventors Aron Nacman, William David Notovitz, Theresa Michelle Marconi, Brian Richard Caffee, Anthony Paul Lanza, and Timothy M. Hunter, and assigned or under obligation of assignment to the same entity as the present application, which application is incorporated by reference in its entirety herein, can be used in various embodiments.

In embodiments, the ping-pong buffers can comprise a pair of write buffers and a pair of read buffers. In embodiments, the pair of read buffers can comprise a pair of line segment buffers. It should be appreciated that the ping-ping buffers can comprise other numbers and/or combinations of write buffers, read buffers, line segment buffers, and/or other buffers. The ping-pong buffers can be implemented using DRAM, SRAM, internal ASIC SRAM, internal FPGA SRAM, or other high-speed memory. The configurable digital image rotator can be configured for optimal performance with respect to parallel read/write accesses with the read and write buffers. More particularly, for writing data to the rotator logic module, a set of data can be written from the image memory to one of the line segment buffers while another access can occur from the second of the line segment buffers to the rotator logic module. Similarly, a set of data can be transferred from the rotator logic module to one of the write buffers while another set of data is being transferred from the second write buffer to the image memory.

In embodiments, the rotator logic module or other logic can divide, partition, or otherwise segment digital images of the image memory into a plurality of tiles, pieces, sections, areas, and the like. In some embodiments, each of the plurality of tiles of a given digital image can be the same size. In other embodiments, each of the tiles can have a number of lines that span a width of the tile. For example, each of a plurality of tiles of a digital image can be 128 pixels wide by 128 lines by 8 bits per pixel, with each line being 128 pixels, or the width of the tile. It should be appreciated that other sizes and configurations for the tiles and lines are envisioned.

In embodiments, the ping-pong buffers can be configured to interface with the rotator logic module. The rotator logic module can be configured to rotate lines of the tiles of the digital images. More particularly, the rotator logic module can take lines of a tile and micro-rotate them for a selected rotation of 90 degrees (90°), 180 degrees) (180°), or 270 degrees) (270°), or other rotations. In embodiments, the rotator logic module can transfer the rotated lines to a write buffer for aggregation as a rotated tile, and determine a memory address in the image memory for the rotated tile. Subsequently, the write buffer can write the rotated tile to the image memory at the memory address.

Figure 1:
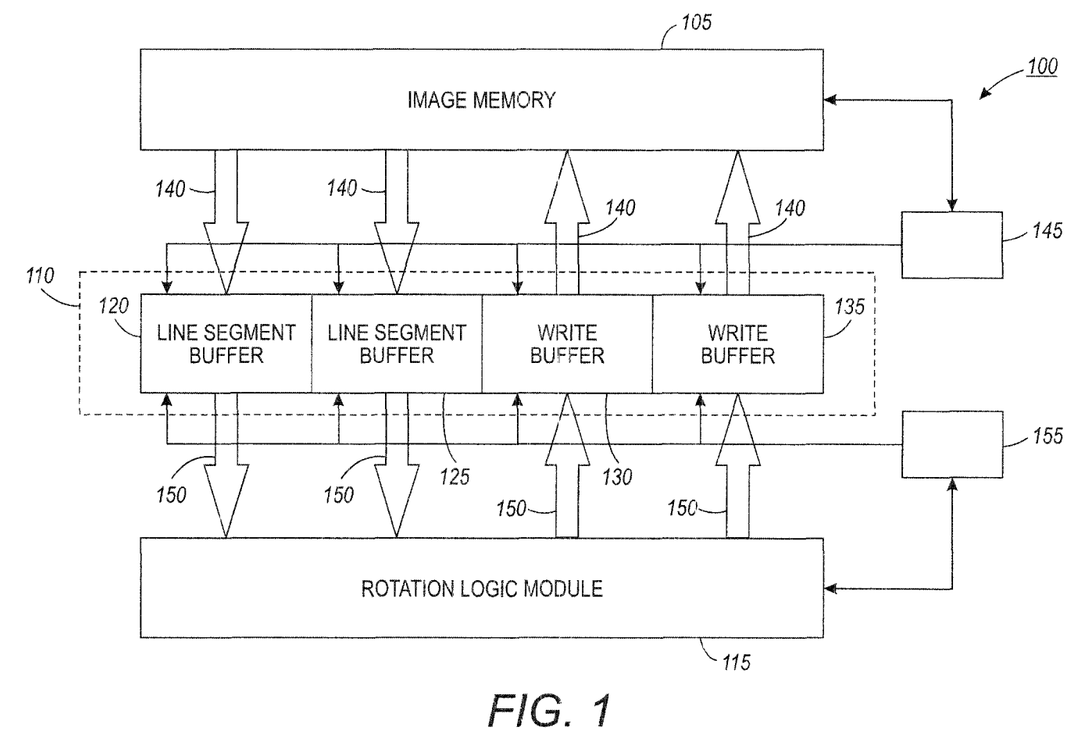
FIG. 1 illustrates an exemplary embodiment of a digital image rotator in accordance with an embodiment.

FIG. 1 illustrates an exemplary embodiment of a digital image rotator 100 in accordance with an embodiment of the invention. It should be readily apparent to those of ordinary skill in the art that the digital image rotator 100 depicted in FIG. 1 represents a generalized schematic illustration and that other components can be added or existing components can be removed or modified. Moreover, the components of the digital image rotator 100 can be implemented in hardware, software, or combinations thereof as known to those skilled in the art.

As shown in FIG. 1, the digital image rotator 100 comprises an image memory 105, a set of ping-pong buffers 110, and a rotator logic module 115. The image memory 105 can be configured to store digital image file(s). The source of the digital image files can be from a scanner, a copier, disk storage device, computing device, a digital camera, and other similar devices (not shown). The digital image can be stored in the image memory 105 in a format of continuous sequence of addresses such that the upper left hand corner is the lowest address while the lower right hand corner is the highest memory address. The image memory 105 can also be configured to be rewritten to allow for a rotated version of the digital image. The orientation of the rotation can be selected from 90°, 180°, or 270° in some embodiments. It should be appreciated that other rotations and/or orientations can be selected.

The image memory 105 can be implemented with high speed memory or registers. The high speed memory can be a type of random access memory ("RAM") such as dynamic, static, extended data output, double data rate ("DDR"), or other similar device. In some embodiments the image memory 105 can be implemented as part of a field programmable array or an application specific integrated circuit ("ASIC").

The image memory 105 can be configured to interface with the set of ping-pong buffers 110, which can comprise at least two line segment buffers 120 and 125. The set of ping-pong buffers 110 can also comprise at least two write buffers, 130 and 135. The buffers (120-135) can interface with the image memory 105 over an image memory-buffer bus 140. A direct memory access (DMA) controller 145 can be configured to interface with the buffers 120-135 and the image memory 105. The DMA controller 145 can increase the speed of data transfers between the image memory 105 and the set of ping-pong buffers 110 by providing a mechanism to transfer large blocks (or bursts) of data between the two components.

The set of ping-pong buffers 110 can be implemented with high speed memory or registers. The high speed memory can be a type of random access memory ("RAM") such as dynamic, static, extended data output, double data rate ("DDR"), or other similar device. In some embodiments the set of ping-pong buffers 110 can be implemented as part of a field programmable array or an application specific integrated circuit ("ASIC").

The set of ping-pong buffers 110 can also be configured to interface with the rotator logic module 115 over a buffer-logic bus 150. A DMA controller 155 can be configured to interface with the buffers 120-135 and the rotator logic module 115. As with DMA controller 145, DMA controller 155 can be configured to increase the performance of the rotator logic module 115 by transferring blocks of data (or bursts) between the ping-pong buffers 110 and the rotator logic module 115.

The rotator logic module 115 can be configured to provide the functionality to rotate the digital image stored in the image memory 105 to a desired orientation. In some embodiments, the rotator logic module 115 can be implemented as part of a field programmable array or an application specific integrated circuit ("ASIC"). More particularly, rotator logic module 115 can be configured to micro-rotate a tile (or piece, section, area, etc.) of the image to the desired orientation. In embodiments, a tile can have a number of pixels (width), a number of lines, and a number of bits per pixel. For example, a tile can be 128 pixels by 128 lines by 8 bits per pixel.

In exemplary embodiments, the rotator logic module 115 can be configured to rotate line segments of a tile of an image. In particular, the line segment buffers 120, 125 can be configured to read line segments of tiles of the images. In embodiments, the size of the line segment buffers can be the width of the tile. For example, if a tile has a size of 128 pixels by 128 lines by 8 bits per pixel, then the size of the line segment buffer is 1024 bits (128 pixels by 8 bits per pixel). An exemplary rotation of a tile of a digital image is illustrated in FIG. 2.

Figure 2:
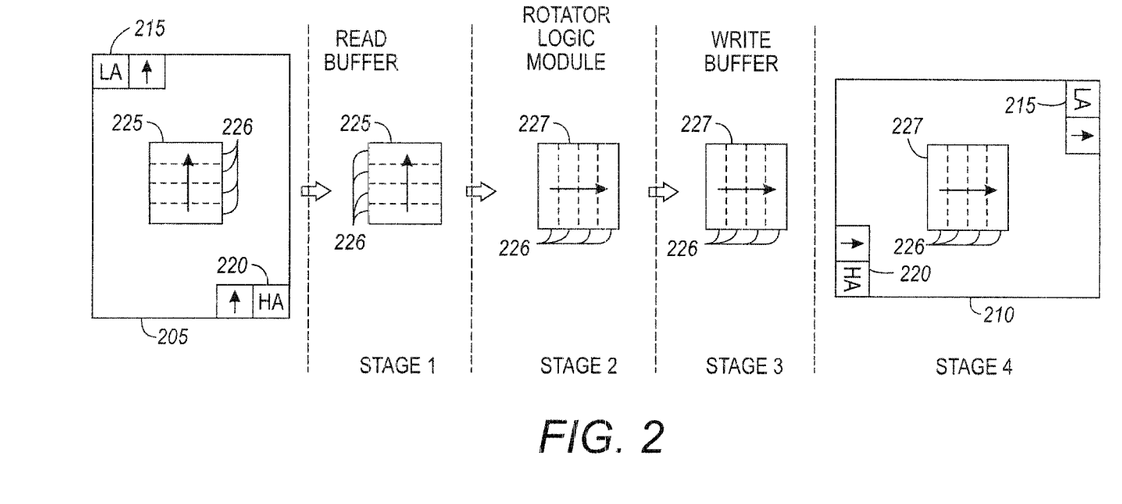
FIG. 2 illustrates an exemplary diagram of the rotation of an image in accordance with another embodiment.

As shown in FIG. 2, digital image 205 can be selected to be rotated to a selected orientation. The digital image 205 can be sequenced into a set of continuous addresses. For example, the lowest address of the sequence of addresses can be the upper left hand corner of the digital image 205, tile 215 (labeled as "LA" in FIG. 2) and the lower hand corner of the digital image, tile 220 (labeled as "HA" in FIG. 2) having the highest address in the address sequence. In embodiments, the size of the tile can be dependent on the bandwidth of the digital image rotator 100.

As shown in FIG. 2, a tile 225 of the digital image 205 can be rotated to the selected orientation (in FIG. 2, for example, 90°). The tile 225 can be sequenced into a set of line segments 226. In embodiments, the number of the set of line segments 226 can be equal to a pixel width of the tile 225. For example, if the tile 225 is 128 pixels wide, then there can be 128 of the set of line segments 226. A selected line segment of the set of line segments 226 can be transferred to a line segment buffer in stage 1, for example, one of the two line segment buffers 120, 125. Although FIG. 2 illustrates that all of the set of line segments 226 are at the line segment buffer, it should be appreciated that the line segment buffer is configured to read each of the set of line segments 226 individually.

From the line segment buffer (120 or 125), the selected line segment 226 can be transferred to the rotator logic module 115. In stage 2, the rotator logic module 115 can be configured to micro-rotate the selected line segment 226 to the desired orientation (in FIG. 2, 90°). In embodiments, the micro-rotation technique used in some of the embodiments can be based on re-ordering of the pixels in a line segment matrix. For example, a 64×1 pixel line segment matrix (or another size) can be re-ordered to produce the desired rotation and then put into a second line segment matrix. In some embodiments, the data can come from the line segment buffer into the read matrix and can then be re-ordered into the write matrix and then written to the write buffer. In some embodiments, the data from the line segment buffer can be put into the read matrix in rows. For example, if a 90° rotation is desired, then the data can be taken out of the read matrix so that the left-to-right line segment becomes a top-to-bottom line segment in the write matrix. For a 270° rotation, the data is taken out of the read matrix so that the left-to-right line segment becomes a bottom-to-top line segment in the write matrix. For a 180° rotation, the data is taken out of the read matrix so that the left-to-right line segment becomes a right-to-left line segment in the write matrix. It should be appreciated that other similar rotations are envisioned.

The rotation logic module 115 can be configured to transfer the rotated line segments 226 to one of the write buffers (130 or 135), in stage 3. In embodiments, the write buffer can be configured to aggregate each rotated line segment 226 of the tile 225 as part of a rotated tile 227. In some embodiments, a consecutive sequence of the line segments 226 can be continuously read to the read buffer of stage 1, sent to the rotation logic module 115 of stage 2, rotated by the rotation logic module 115 in stage 2, transferred to the write buffer of stage 3, and aggregated by the write buffer until the rotated tile 227 formed.

The rotation logic module 115 can also be configured to macro-rotate the rotated tile 227 comprising the rotated set of line segments 226. More specifically, the rotation logic module 115 can recalculate the current address of the tile 225 to a new address of the rotated tile 227 that would be in a rotated digital image 210. More particularly, the tiles of the digital image 205 can be read in line segments starting with the top left corner in blocks that are equal in size to the width of the tiles. This block can be micro-rotated and aggregated with others to form a rotated tile, and the write buffer data can be put back into memory in the correct location for the desired rotation. In embodiments, because the image can be a continuous string of addresses in memory, the write DMA need only calculate the starting address of each burst of data for the start of each line of the block. This calculation can be a simplistic addition/subtraction based on the size of the original image, the desired rotation angle, and the position of the block in the original image. After the first line segment is rotated, the next line segment to be rotated is immediately below the first line segment. For the purposes of efficiency, the input image can be sized so that an integer number or multiples thereof of line segments are in the image.

In embodiments, one of the write buffers (130 or 135) can be configured to transfer the rotated tile 227 back to the image memory 105 at the new address position for the rotated digital image 210, as shown in stage 4 of FIG. 2. It should be readily obvious to those skilled in the art that the other rotation orientations are well within the scope of these embodiments.

Returning to FIG. 1, in accordance with some embodiments, the digital image rotator 100 can be optimized for efficiency through the use of the ping-pong buffers 110. More particularly, the ping-pong buffers 110 can be used as such that when a tile of the digital image is being rotated, line segments of the next tile of the digital image is being read into the ping-pong buffers 110 while the previous rotated tile is being written into one of the ping-pong buffers. Since there are two line segment buffers and two write buffers in the ping-pong buffers 110, three operations (a read from image memory, a rotation, and a write to image memory) can be occurring substantially simultaneously, thus, increasing efficiency.

In embodiments, by utilizing line segment buffers instead of conventional read buffers, performance can improve. For example, if a tile has a size of 128 pixels by 128 lines by 8 bits per pixel, each of a write buffer and a read buffer is 131,072 bits. If there are two (2) write buffers and two (2) read buffers, the on-chip buffer size is 524,288 bits. In contrast, the size of each line segment buffer is equal to the size of the width of the tile, or 128 pixels by 8 bits per pixel, or 1024 bits. Therefore, by implementing two (2) line segment buffers and two (2) write buffers, the on-chip buffer size is 262,144 bits (write buffers)+2048 bits (line segment buffers), or 264,192 total bits.

Figure 3:
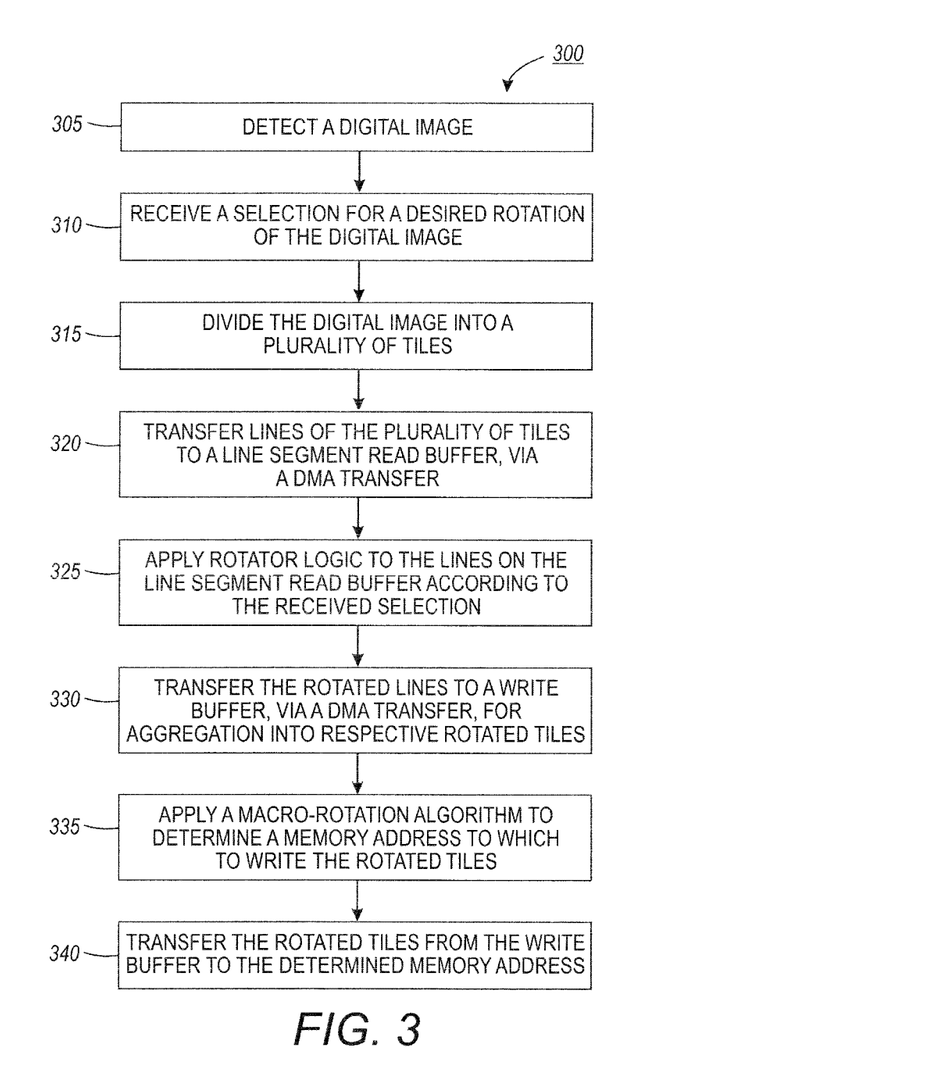
FIG. 3 illustrates an exemplary flow diagram implemented by the digital image rotator in accordance with another embodiment.

FIG. 3 illustrates an exemplary flow diagram 300 implemented by the digital image rotator in accordance with another embodiment. It should be readily apparent to those of ordinary skill in the art that the flow diagram 300 depicted in FIG. 3 represents a generalized illustration and that other steps can be added or existing steps can be removed or modified.

As shown in FIG. 3, the digital image rotator 105 can be configured to detect a digital image, in step 305. In embodiments, the digital image can be sent or detected from a copier, a scanner, a computer, a digital camera, or any other similar device that can generate a digital image.

In step 310, the digital image rotator 105 can be configured to receive a selection for a desired rotation of the digital image. In some embodiments, the list of possible rotations can be 90°, 180° and 270°. The selection of the rotation can be implemented using a user interface from a device such as a client computer, and other devices. In other embodiments, the desired rotation can be included in metadata associated with the digital image. In step 315, the digital image rotator 105 can be configured to divide the digital image into a plurality of tiles. In embodiments, each of the plurality of tiles can comprise a pixel width, a number of lines, and a number of bits per pixel. For example, a tile can comprise dimensions of 128 pixels wide by 128 lines by 8 bits per pixel.

In step 320, the DMA controller 145 can be configured to transfer lines of the plurality of tiles to one of the line segment buffers (120, 125). In embodiments, the lines of the plurality of tiles can have a size equal to a width of the plurality of tiles. For example, if a tile is 128 pixels wide, then the lines can comprise 128 pixels. Further, the size of the line segment buffers (120, 125) can have a size equal to the width of the plurality of tiles. For example, if a tile is 64 pixels wide with 8 bits/pixel, then the line segment buffers (120, 125) can be 512 bits.

In step 325, the rotator logic module 115 can be configured to read a line from one of the line segment buffers (120, 125) and apply rotator logic to the line according to the rotation selection. In embodiments, as the rotator logic module 115 is reading from the selected line segment buffer (120, 125), the other line segment buffer (125, 120) can be filled with an additional line segment of the tile from the image memory 105. When the rotator logic module 115 finishes reading from the selected line segment buffer (120, 125), the rotator logic module 115 can switch to the other line segment buffer (125, 120) to retrieve more data. In embodiments, the switching of line segment buffers can continue until all the data has been processed.

In embodiments, the rotator logic module 115 can apply the rotator logic by applying a micro-rotation algorithm to rotate the desired line to the selected orientation. In step 330, the rotator logic module 115 can transfer the rotated lines to one of the write buffers (130, 135) for aggregation as respective rotated tiles. In embodiments, the rotator logic module 115 can transfer the rotated lines to the write buffer via a DMA transfer. In step 335, the rotator logic module 115 can apply a macro-rotation algorithm to determine a memory address of the image memory 105 to which to write the rotated tiles. In embodiments, the rotated tiles can be written to any form of memory in any way.

In step 340, the rotator logic module 115 can transfer the rotated tiles from the write buffers (130, 135) to the image memory 105 to the appropriate address location as determined by the macro-rotation algorithm in the rotator logic module 115. In embodiments, the transfer of rotated tiles can be accomplished using the DMA controller 145. In other embodiments, while a selected rotated tile is being transferred from the first write buffer (130, 135), the rotator logic module 105 can be substantially simultaneously writing the next rotated tile to the second write buffer (135, 130). This process of switching write buffers (130, 135) can continue until the digital image is completely processed.

Figure 4:
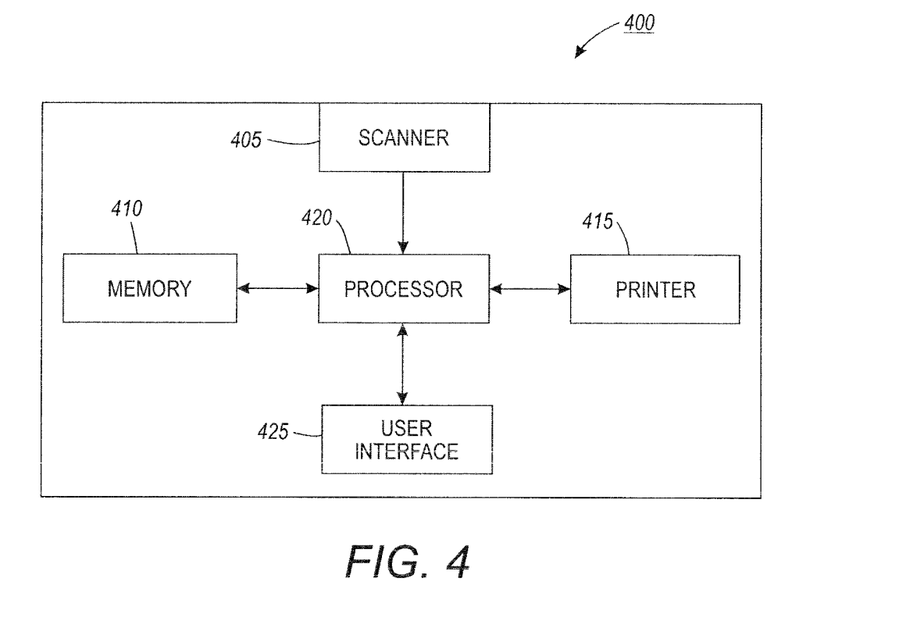
FIG. 4 illustrates a hardware diagram in accordance with another embodiment.

FIG. 4 depicts an exemplary hardware diagram of an imaging device 400 according to embodiments. The imaging device 400 can comprise a scanner 405, a memory 410, and a printer 415. The scanner 405 in combination with a processor 420 can scan hard copy original documents, convert the original documents into digital images, process the digital images, and save the scanned, processed, and enlarged images in a memory (not shown in figures). For example, the memory can be any storage device capable of storing data such as a server, a local or remote hard drive, a portable jump drive, and the like. The printer 415 can produce a printed copy of the original documents, the processed images, enlarged portions of the documents, and other arrangements of the documents.

The processor 420 can process image data and direct the functions of the imaging device 400 as described herein. For example, the processor 420 can rotate images using a plurality of ping pong buffers and store the rotated image in the memory according to present embodiments. The processor 420 can be coupled to a user interface (UI) 425 comprising, for example, a touchpad or series of buttons which can allow a user a control and a user-readable setup and status screen. In use, the user can select one or more functions and/or options from a number of different functions and/or options provided by the imaging device 400 through the use of the UI 425. For example, the user can select an image to rotate and an orientation selection via the UI 425. The processor 420 can further direct the printer 415 to output printed pages according to selections received at the UI 425.

Certain embodiments can be performed as a computer program. The computer program can exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A device for rotating images, the device comprising:
an image memory configured to store an image, wherein the image is sequenced into a plurality of tiles, and each of the plurality of tiles is sequenced into a plurality of lines;
a first line segment buffer configured to read, from the image memory, a first line of a first the of the plurality of tiles, wherein a size of the first tile comprises a number of lines, a number of pixels per line, and a number of bits per pixel, and wherein a size of the first line segment buffer is equal to the number of pixels per line multiplied by the number of bits per pixel;
a second line segment buffer configured to read, from the image memory, a second line of the first the of the plurality of tiles, wherein the first and second lines are different;
a rotation logic module configured to sequentially read the first line from the first line segment buffer and the second line from the second line segment buffer and to separately rotate the first and second lines based on an orientation selection; and
a first write buffer configured to simultaneously receive the rotated first and second lines from the rotation logic module for aggregation as a rotated tile, and to determine an address in the image memory for the rotated tile, wherein the first write buffer is configured to write the rotated the to the image memory at the address.

2. The device of claim 1, further comprising a direct memory access (DMA) controller configured to implement a DMA write transfer and a DMA read transfer.

3. The device of claim 2, wherein the rotation logic module is further configured to read the first line from the first line segment buffer when the orientation selection is 180 degrees.

4. The device of claim 1, wherein rotating the first and second lines based on the orientation selection comprises rotating pixels associated with the first and second lines.

5. The device of claim 1, wherein the rotation logic module is further configured to write the rotated tile to the write buffer using a DMA write transfer.

6. The device of claim 1, wherein a size of the first line segment buffer and the first write buffer is selected based on a burst size of a DMA transfer.

7. The device of claim 1, wherein a size of the first line segment buffer and the first write buffer is selected based on at least one of cost or performance of the device.

8. The device of claim 1, wherein the orientation selection comprises one of a 90 degree rotation and a 270 degree rotation.

9. The device of claim 1, wherein a size of the first and second lines of the first tile is equal to a width of the first tile.

10. A method for operating a device, the method comprising: storing a digital image in an image memory, wherein the digital image is sequenced into a plurality of tiles, and each of the plurality of tiles is sequenced into a plurality of lines;
transferring a first line of a first tile of the plurality of tiles to a first line segment buffer wherein a size of the first tile comprises a number of lines, a number of pixels per line, and a number of bits per pixel, and wherein a size of the line segment buffer is equal to the number of pixels per line multiplied by the number of bits per pixel;
transferring a second line of the first tile of the plurality of tiles to a second line segment buffer, wherein the first and second lines are different;
sequentially reading the first line from the first line segment buffer and the second line from the second line segment buffer;
separately rotating the first and second lines according to one of a 90 degree rotation, a 180 degree rotation, and a 270 degree rotation;
transferring the rotated first and second lines to a write buffer simultaneously for aggregation as a rotated tile;
determining an address in the image memory for the rotated tile; and writing the rotated tile to the image memory from the write buffer for storage at the address.

11. The method of claim 10, wherein transferring the first and second lines is implemented by direct memory access (DMA) transactions.

12. The method of claim 10, further comprising selecting a size of the first line segment buffer and the write buffer based on an optimal burst size for a rotation of one of 90 degrees and 270 degrees.

13. The method of claim 10, further comprising selecting a size of the first line segment buffer and the write buffer based on an optimal burst size for a rotation of 180 degrees.

14. The method of claim 10, wherein a size of the first and second lines of the first the is equal to a width of the first tile.

15. A non-transitory computer program for use with a computer, the computer program comprising a computer readable storage medium storing instructions to implement the method of claim 10.

16. A system for rotating images, the system comprising:
a processor coupled to memory and configured to implement:
an image memory configured to store an image, wherein the image is sequenced into a plurality of tiles, and each of the plurality of tiles is sequenced into a plurality of lines;
a first line segment buffer configured to read, from the image memory, a first line of a first tile of the plurality of tiles, wherein a size of the first tile comprises a number of lines, a number of pixels per line, and a number of bits per pixel, and wherein a size of the first line segment buffer is equal to the number of pixels per line multiplied by the number of bits per pixel; and
a second line segment buffer configured to read, from the image memory, a second line of the first tile of the plurality of tiles, wherein the first and second lines are different, and wherein the processor is configured to sequentially read the first line from the first line segment buffer and the second line from the second line segment buffer, separately rotate the first and second lines based on an orientation selection, transfer the rotated first and second lines simultaneously to a write buffer for aggregation as a rotated tile; and
determine an address in the image memory for the rotated tile, wherein the write buffer is configured to write the rotated tile to the image memory at the address.

17. The system of claim 16, wherein the processor is further configured to implement a direct memory access (DMA) write transaction and a DMA read transaction.

18. The system of claim 16, wherein a size of the first line segment buffer and the write buffer is based on a burst size of a DMA transfer.

19. The system of claim 16, wherein a size of the line segment buffer and the write buffer is based on at least one of cost or performance of the device.

20. The system of claim 16, wherein a size of the first and second lines of the first the is equal to a width of the first tile.

21. The device of claim 1, wherein the first line segment buffer is smaller than the first write buffer.

22. The device of claim 1, wherein the first line segment buffer is sized to individually receive the first and second lines of the first file, and wherein the first write buffer is sized to receive the first tile.

23. The device of claim 1, wherein the second line segment buffer is configured to be filled with the second line from the image memory simultaneously with the rotator logic module reading the first line from the first line segment buffer, and wherein the rotator logic module switches to read the second line from the second line segment buffer when the rotator logic module finishes reading the first line.

\* \* \* \* \*